US012658152B2

(12) United States Patent
Jung et al.

(10) Patent No.: US 12,658,152 B2
(45) Date of Patent: Jun. 16, 2026

(54) DISPLAY DEVICE DETERMINING A GLOBAL DIMMING VALUE BASED ON AN OBTAINED MOTION SUM VALUE

(71) Applicant: LG ELECTRONICS INC., Seoul (KR)

(72) Inventors: Sunwoo Jung, Seoul (KR); Jongho Park, Seoul (KR); Kyuyong Chung, Seoul (KR); Wonki Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/781,439

(22) Filed: Jul. 23, 2024

(65) Prior Publication Data

US 2025/0384851 A1 Dec. 18, 2025

(30) Foreign Application Priority Data

Jun. 12, 2024 (WO) ................ PCT/KR2024/008086

(51) Int. Cl.
*G09G 3/34* (2006.01)
*G09G 3/20* (2006.01)
*G09G 3/36* (2006.01)

(52) U.S. Cl.
CPC ......... *G09G 3/3426* (2013.01); *G09G 3/3648* (2013.01); *G09G 3/2092* (2013.01);
(Continued)

(58) Field of Classification Search
CPC .......... G09G 3/2092–2096; G09G 3/34–3426; G09G 3/3648; G09G 3/3666; G09G 5/10;
(Continued)

(56) References Cited

U.S. PATENT DOCUMENTS

2010/0295767 A1* 11/2010 Lee ...................... G09G 3/3426 345/102
2011/0032430 A1* 2/2011 Prieto ................ H04N 21/4436 348/E5.119
(Continued)

FOREIGN PATENT DOCUMENTS

JP 2001-281622 10/2001
KR 10-2005-0074725 7/2005
(Continued)

OTHER PUBLICATIONS

PCT International Application No. PCT/KR2024/008086, International Search Report dated Mar. 6, 2025, 3 pages.

*Primary Examiner* — Keith L Crawley
(74) *Attorney, Agent, or Firm* — LEE, HONG, DEGERMAN, KANG & WAIMEY

(57) ABSTRACT

According to an embodiment of the present disclosure, a display device may comprise a liquid crystal display panel configured to display an image; a backlight including a plurality of backlight blocks configured to provide a light to the liquid crystal display panel, wherein each of the plurality of backlight blocks includes a plurality of light sources; and a controller configured to obtain a plurality of motion values corresponding to each of a plurality of local images constituting the image, obtain a motion sum value of the image by summing the plurality of obtained motion values, and determine a global dimming value based on the obtained motion sum value.

9 Claims, 13 Drawing Sheets

(52) U.S. Cl.
CPC ............... *G09G 2320/0233* (2013.01); *G09G 2320/0626* (2013.01); *G09G 2360/10* (2013.01); *G09G 2360/16* (2013.01)

(58) Field of Classification Search
CPC ....... G09G 2310/0237; G09G 2360/10; G09G 2360/16; G09G 2320/0233; G09G 2320/0257–0266; G09G 2320/0613–0653; G09G 2320/0686; G09G 2320/10–106
See application file for complete search history.

(56) References Cited

U.S. PATENT DOCUMENTS

| | | | | |
|---|---|---|---|---|
| 2011/0122168 | A1* | 5/2011 | Lee | G09G 3/3426 345/102 |
| 2011/0316902 | A1* | 12/2011 | Onishi | G09G 3/3611 345/102 |
| 2012/0007844 | A1* | 1/2012 | Nakanishi | H05B 45/10 345/204 |
| 2013/0215161 | A1* | 8/2013 | Cho | G09G 3/3406 345/694 |
| 2014/0198123 | A1* | 7/2014 | Shibamiya | G09G 3/36 345/589 |
| 2019/0258113 | A1* | 8/2019 | Tsuchida | G09G 3/3426 |
| 2020/0135074 | A1* | 4/2020 | Wooster | G09G 3/006 |
| 2020/0135122 | A1* | 4/2020 | Song | G09G 3/3413 |
| 2021/0065621 | A1* | 3/2021 | Lee | G09G 3/3208 |
| 2021/0166634 | A1* | 6/2021 | Hong | G09G 3/3233 |
| 2023/0162667 | A1* | 5/2023 | Park | G09G 3/3208 365/189.05 |
| 2023/0263025 | A1* | 8/2023 | Ueno | H05B 33/14 |

FOREIGN PATENT DOCUMENTS

| | | |
|---|---|---|
| KR | 10-2008-0017280 | 2/2008 |
| KR | 10-2013-0027809 | 3/2013 |
| KR | 10-2643587 | 3/2024 |

* cited by examiner

1200

| Motion | fast | mid | slow |
|---|---|---|---|
| Motion data (rmv_Max Sum) | 1023 | 600 | 127 |
| Global dimming (max 8bit) | 127 | 192 | 255 |

DISPLAY DEVICE DETERMINING A GLOBAL DIMMING VALUE BASED ON AN OBTAINED MOTION SUM VALUE

CROSS-REFERENCE TO RELATED APPLICATION(S)

Pursuant to 35 U.S.C. § 119, this application claims the benefit of an earlier filing date and right of priority to International Application No. PCT/KR2024/008086, filed on Jun. 12, 2024, the contents of which are all hereby incorporated by reference herein in their entireties.

BACKGROUND OF THE INVENTION

1. Field of the Invention

The present disclosure relates to a display device, and more specifically, to a display device for improving motion and three-dimensionality of an image.

2. Discussion of the Related Art

Liquid crystal displays may be miniaturized compared to cathode ray tube (CRT), so they are used in display device such as portable information device, office equipment, and computer.

Transmissive liquid crystal display, which make up the majority of liquid crystal display device, displays image by controlling the electric field applied to the liquid crystal layer to modulate light incident from a backlight.

Local dimming is a backlight control technology used in LCD (Liquid Crystal Display) panel and monitors that use a backlight. Local dimming may improve the overall contrast ratio of the screen by lighting the screen locally and making dark area darker and bright area brighter.

A display device equipped with a recent liquid crystal display performs a local dimming method, which is a local lighting method, and then simultaneously uses a global dimming method that uniformly reduces the duty of a signal provided to the backlight to improve the overall image.

However, in the related art, because motion data for a local image corresponding to a local backlight block could not be obtained, the motion data and a current, a duty of the signal provided to the light source of the backlight were not linked.

As a result, there is a problem where the duty of the signal supplied to the backlight is uniformly reduced by a certain ratio, and the current supplied to the backlight is changed, causing the image to become very dark.

SUMMARY OF THE INVENTION

The purpose of the present disclosure may be to enhance a motion and a sharpness of the image by changing the current and the duty of the dimming signal output by the light source driving circuit according to the motion of the image.

The purpose of the present disclosure may be to improve a contrast ratio and the sharpness of the image by reflecting the motion data of the image in the global dimming step.

The purpose of the present disclosure may be to improve the sharpness of image by improving motion in image with fast motion.

According to an embodiment of the present disclosure, a display device may comprise a liquid crystal display panel configured to display an image; a backlight including a plurality of backlight blocks configured to provide a light to the liquid crystal display panel, wherein each of the plurality of backlight blocks includes a plurality of light sources; and a controller configured to obtain a plurality of motion values corresponding to each of a plurality of local images constituting the image, obtain a motion sum value of the image by summing the plurality of obtained motion values, and determine a global dimming value based on the obtained motion sum value.

According to an embodiment of the present disclosure, a method of operating a display device including a liquid crystal display panel configured to display an image and a backlight including a plurality of backlight blocks configured to provide a light to the liquid crystal display panel may comprise obtaining a plurality of motion values corresponding to each of a plurality of local images constituting the image, obtaining a motion sum value of the image by summing the plurality of obtained motion values, and determining a global dimming value based on the obtained motion sum value.

According to an embodiment of the present disclosure, as the duty of the signal provided to the light source 252 of the backlight 250 is adaptively changed, the current flowing in the light source 252 may also be adaptively changed. Accordingly, the sharpness is improved for fast-moving image and a luminance is compensated, thereby preventing image darkening.

According to an embodiment of the present disclosure, as a motion speed of the image changes, the duty of the signal that controls the operation of the light source is adaptively changed, thereby improving the dragging phenomenon of the image and improving the sharpness. Additionally, by performing luminance compensation according to a duty change, darkening of the image may be prevented.

DETAILED DESCRIPTION OF THE PREFERRED EMBODIMENTS

Hereinafter, the present specification will be described in more detail with reference to the drawings.

The suffixes "module" and "part" used in the following description are assigned purely for the convenience of drafting this specification and do not inherently impart any special significance or role. Therefore, the terms "module" and "part" may be used interchangeably with each other.

Terms containing ordinal numbers, such as first, second, etc, may be used to describe various components, but the components are not limited by the terms. The above terms are used only for the purpose of distinguishing one component from another.

Singular expression includes plural expressions unless the context clearly dictates otherwise.

In this application, terms such as "comprise" or "have" are intended to designate the presence of features, numbers, steps, operations, components, parts, or combinations thereof described in the specification, but are not intended to indicate the presence of one or more other features and it should be understood that this does not exclude in advance the possibility of the existence or addition of elements, numbers, steps, operations, components, parts, or combinations thereof.

Figure 1:
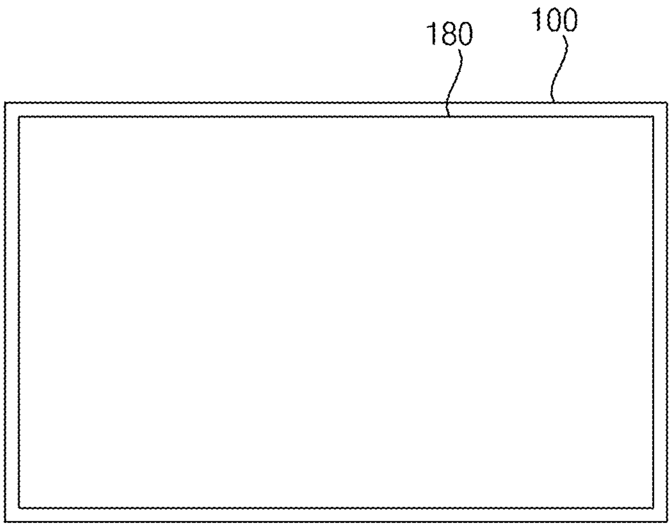
FIG. 1 is a diagram illustrating a display device according to an embodiment of the present invention.

FIG. 1 is a diagram illustrating a display device according to an embodiment of the present disclosure.

The display device 100 may include a display 180.

The display (180) may be implemented as either a Liquid Crystal Display (LCD) panel or an Organic Light Emitting Diode (OLED) panel.

Meanwhile, the display device 100 of FIG. 1 may be a monitor, TV, tablet PC, mobile terminal, etc.

Figure 2:
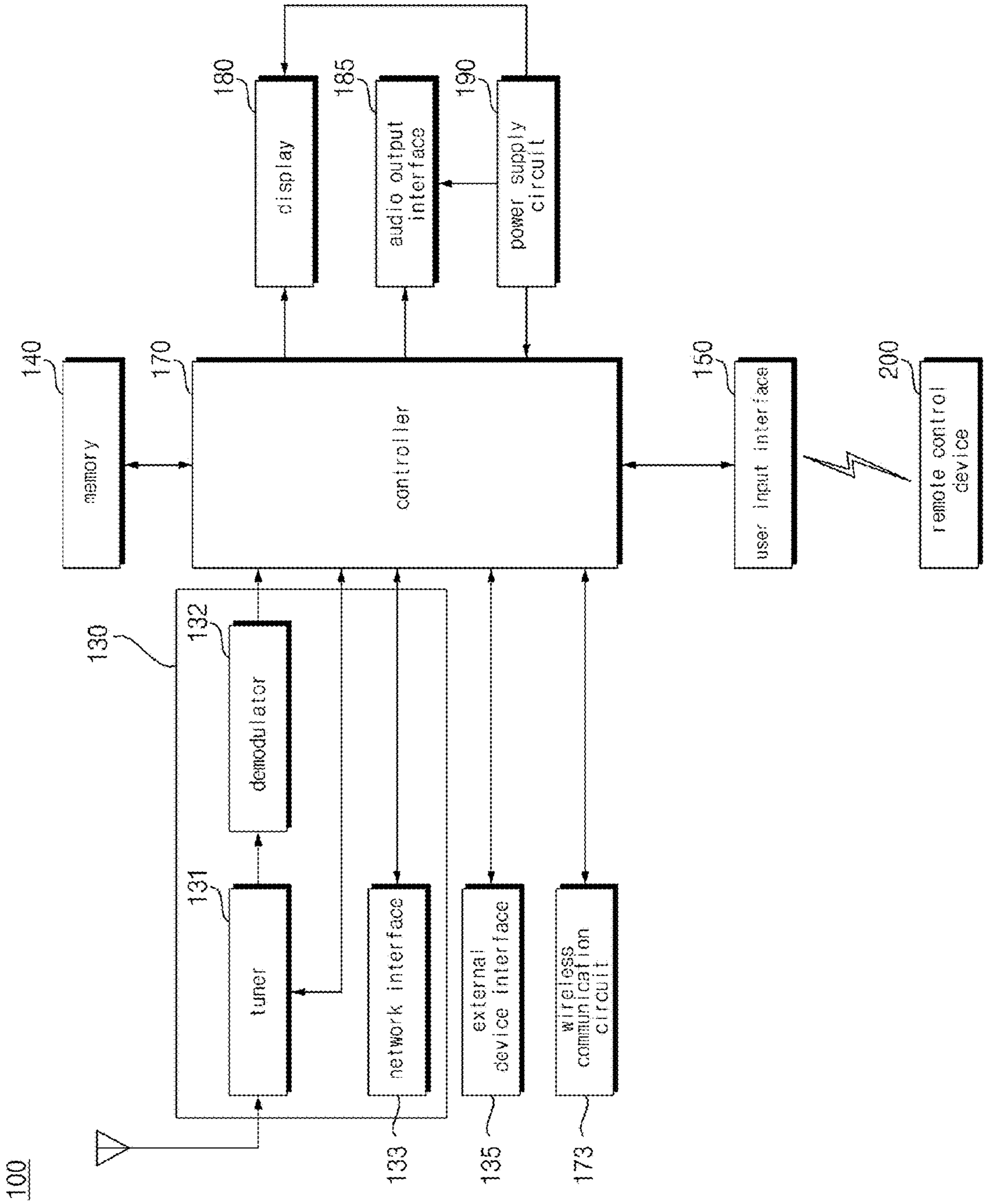
FIG. 2 is an example of a block diagram of the inside of the display device in FIG. 1.

FIG. 2 is a block diagram showing the configuration of the display device of FIG. 1.

Referring to FIG. 2, the display device 100 may include a broadcast receiver 130, an external device interface 135, a memory 140, a user input interface 150, a controller 170, and a wireless communication circuit 173, a display 180, an audio output interface 185, and a power supply circuit 190.

The broadcast receiver 130 may include a tuner 131, a demodulator 132, and a network interface 133.

The tuner 131 may select a specific broadcast channel according to a channel selection command. The tuner 131 may receive a broadcast signal for a specific selected broadcast channel.

The demodulator 132 may separate the received broadcast signal into a video signal, an audio signal, and a data signal related to the broadcast program, and may restore the separated video signal, audio signal, and data signal to a form that may be output.

The external device interface 135 may receive an application or application list in an adjacent external device and transmit it to the controller 170 or the memory 140.

The external device interface 135 may provide a connection path between the display device 100 and an external device. The external device interface 135 may receive one or more of video and audio output from an external device connected wirelessly or wired to the display device 100 and transmit it to the controller 170. The external device interface 135 may include a plurality of external input terminals. The plurality of external input terminals may include an RGB terminal, one or more High Definition Multimedia Interface (HDMI) terminals, and a component terminal.

An image signal from an external device input through the external device interface 135 may be output through the display 180. A audio signal from an external device input through the external device interface 135 may be output through the audio output interface 185.

An external device that may be connected to the external device interface 135 may be any one of a set-top box, Blu-ray player, DVD player, game console, sound bar, smartphone, PC, USB memory, or home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 stores program for processing and controlling each signal in the controller 170, and may store signal-processed video, audio, or data signal.

The memory 140 may perform a function for temporarily storing video, voice, or data signal input from the external device interface 135 or the network interface 133, and may store information about a predetermined image through a channel memory function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface unit or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 and the speaker 185.

Figure 3:
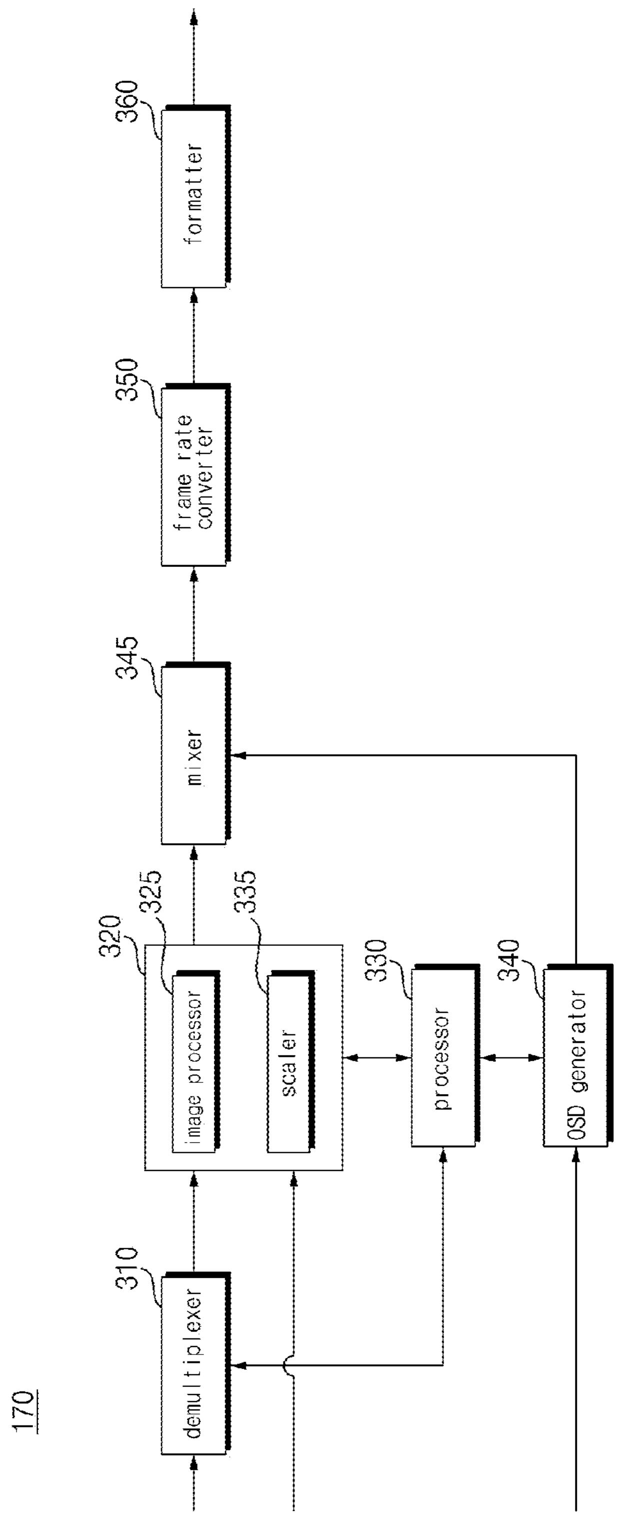
FIG. 3 is an example of a block diagram of the inside of a controller in FIG. 2.

FIG. 3 is an example of an internal block diagram of the controller of FIG. 2.

When described with reference to the drawing, the controller 170 according to an embodiment of the present disclosure may include a demultiplexer 310, an image processor 320, a processor 330, an OSD generator 340, and a mixer 345, a frame rate converter 350, and a formatter 360.

the controller 170 may further include an audio processor (not shown) and a data processor (not shown).

The demultiplexer 310 demultiplexes the input stream. For example, when MPEG-2 TS is input, it may be demultiplexed and separated into video, voice, and data signals. Here, the stream signal input to the demultiplexer 310 may be a stream signal output from the tuner 110, the demodulator 120, or the external device interface 130.

The image processor 320 may perform image processing of demultiplexed video signal. For this purpose, the image processor 320 may include an video decoder 325 and a scaler 335.

The video decoder 325 decodes the demultiplexed video signal, and the scaler 335 performs scaling so that the resolution of the decoded video signal may be output on the display 180.

The video decoder 325 may be equipped with decoder of various standards. For example, an MPEG-2, H,264 decoder, a 3D video decoder for color image and depth image, a decoder for multiple viewpoint images, etc. may be provided.

The processor 330 may control overall operations within the display device 100 or the controller 170. For example, the processor 330 may control the tuner 110 to select (tuning) an RF broadcast corresponding to a channel selected by the user or a pre-stored channel.

Additionally, the processor 330 may control the display device 100 by a user command or internal program input through the user input interface 150.

Additionally, the processor 330 may perform data transmission control with the network interface 135 or the external device interface 130.

Additionally, the processor 330 may control the operations of the demultiplexer 310, the image processor 320, and the OSD generator 340 within the controller 170.

The OSD generator 340 generates an OSD signal according to user input or by itself. For example, based on a user input signal, a signal may be generated to display various information in graphic or text on the screen of the display 180. The generated OSD signal may include various data such as a user interface screen of the display device 100, various menu screen, widget, and icon. Additionally, the generated OSD signal may include 2D object or 3D object.

Additionally, the OSD generator 340 may generate a pointer that may be displayed on the display 180 based on the pointing signal input from the remote control device 200. In particular, such a pointer may be generated in a pointing signal processor, and the OSD generator 340 may include such a pointing signal processor (not shown). Of course, it is also possible that the pointing signal processor (not shown) is provided separately rather than within the OSD generator 340.

The mixer 345 may mix the OSD signal generated by the OSD generator 340 and the decoded video signal processed by the image processor 320. The mixed video signal is provided to the frame rate converter 350.

The frame rate converter (FRC) 350 may convert the frame rate of the input video. Meanwhile, the frame rate converter 350 is also capable of outputting the video as is without separate frame rate conversion.

Meanwhile, the formatter 360 may change the format of an input video signal into a video signal for display on a display and output it.

The formatter 360 may change the format of the video signal. For example, the format of the 3D video signal may be changed to any one of various 3D formats such as Side by Side format, Top/Down format, Frame Sequential format, Interlaced format, Checker Box format.

Meanwhile, the audio processor (not shown) in the controller 170 may perform audio processing of the demultiplexed audio signal. For this purpose, the audio processor (not shown) may be equipped with various decoders.

Additionally, the audio processor (not shown) within the controller 170 may process bass, treble, and volume control.

The data processor (not shown) within the controller 170 may perform data processing of the demultiplexed data signal. For example, if the demultiplexed data signal is an encoded data signal, it may be decoded. The encoded data signal may be electronic program guide information including broadcast information such as the start time and end time of the broadcast program aired on each channel.

Meanwhile, the block diagram of the controller 170 shown in FIG. 3 is a block diagram for an embodiment of the present disclosure. Each component of the block diagram may be integrated, added, or omitted depending on the specifications of the controller 170 that is actually implemented.

In particular, the frame rate converter 350 and the formatter 360 may not be provided within the controller 170, but may be provided separately or as a single module.

Figure 4:
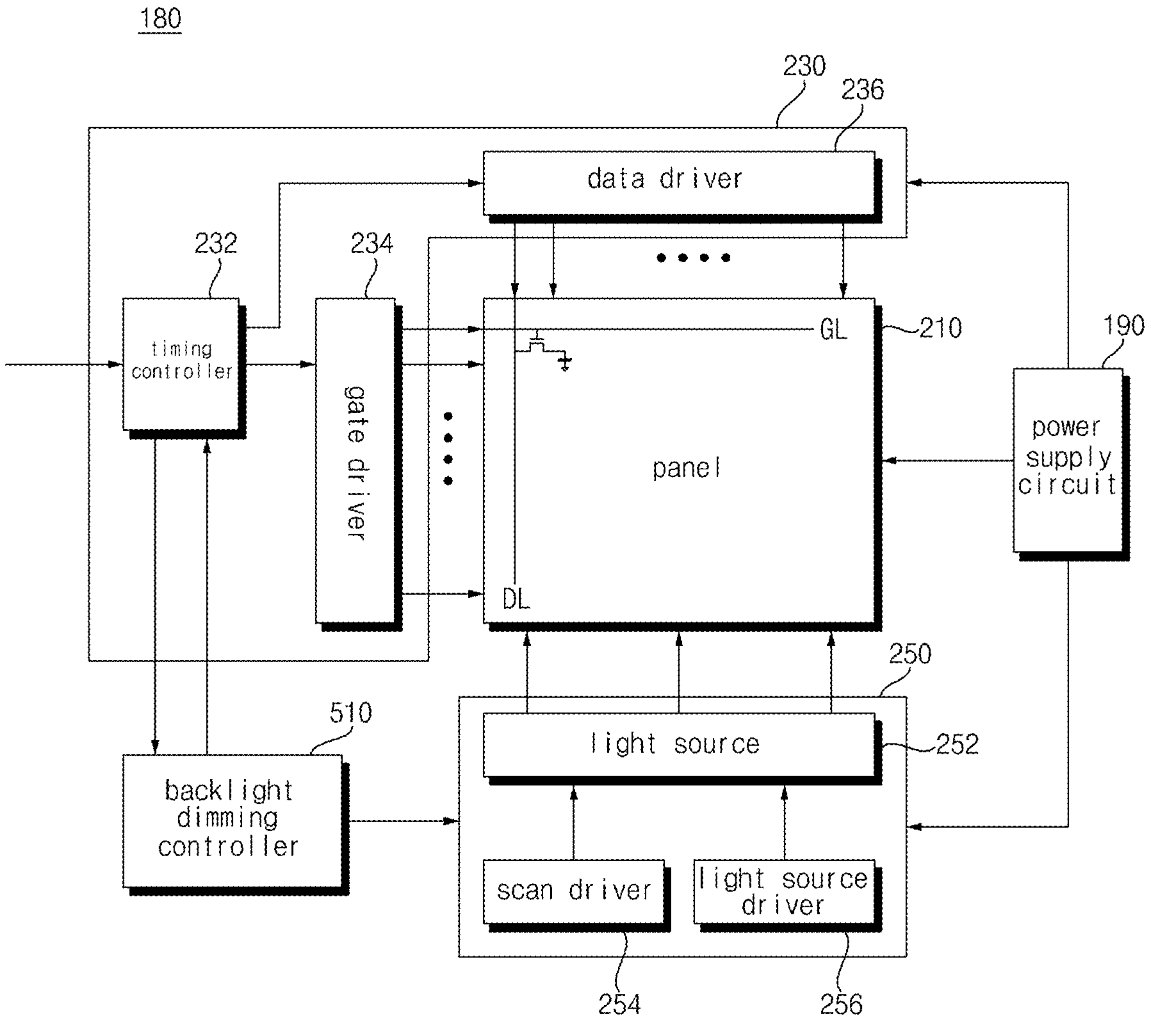
FIG. 4 is a block diagram of the inside of the display.

FIG. 4 is an internal block diagram of the display of FIG. 2.

Referring to the drawing, the display module 180 based on a liquid crystal display panel (LCD panel) may include a liquid crystal display panel 210, a driving circuit 230, a backlight 250, and a backlight dimming controller 510.

In order to display an image, a plurality of gate lines (GL) and data lines (DL) are intersected in a matrix form, and the liquid crystal display panel 210 may include a first substrate a thin film transistor and a pixel electrode connected to it are formed in the intersecting area, a second substrate provided with a common electrode, and a liquid crystal layer formed between the first substrate and the second substrate.

The driving circuit 230 drives the liquid crystal display panel 210 through control signal and data signal supplied from the controller 170 of FIG. 1. To this end, the driving circuit 230 includes a timing controller 232, a gate driver 234, and a data driver 236.

The timing controller 232 receives a control signal, R, G, B data signals, vertical synchronization signal (Vsync), etc. from the controller 170, and controls the gate driver 234 and the data driver 236 in response to the control signal and rearranges the R, G, and B data signals to provide to the data driver 236.

Under the control of the gate driver 234, data driver 236, and timing controller 232, scanning signal and image signal are supplied to the liquid crystal display panel 210 through the gate line (GL) and data line (DL).

The backlight 250 supplies light to the liquid crystal display panel 210. To this end, the backlight 250 may include a light source 252, as may driver 254 that controls the scanning drive of the light source 252, and a light source driver 256 that turns on/off the light source 252.

With the light transmittance of the liquid crystal layer adjusted by the electric field formed between the pixel electrode and the common electrode of the liquid crystal display panel 210, a predetermined image is displayed using light emitted from the backlight 250.

The power supply circuit 190 may supply a common electrode voltage (Vcom) to the liquid crystal display panel 210 and a gamma voltage to the data driver 236. Additionally, driving power for driving the light source 252 may be supplied to the backlight 250.

Meanwhile, the backlight 250 may be divided into a plurality of blocks and driven. The controller 170 may control the display 180 to perform local dimming by setting a dimming value for each of the plurality of blocks.

Specifically, the timing controller 232 outputs input image data (RGB) to the backlight dimming controller 510, and the backlight dimming controller 510 may calculate the dimming value of each of the plurality of blocks based on the input image data (RGB) received from the timing controller 232.

The backlight dimming controller 510 may output dimming values to the backlight 250. The dimming value may include at least one of a duty ratio for driving each backlight block or an current magnitude ratio.

The backlight dimming controller 510 may be included in the controller 170.

Figure 5:
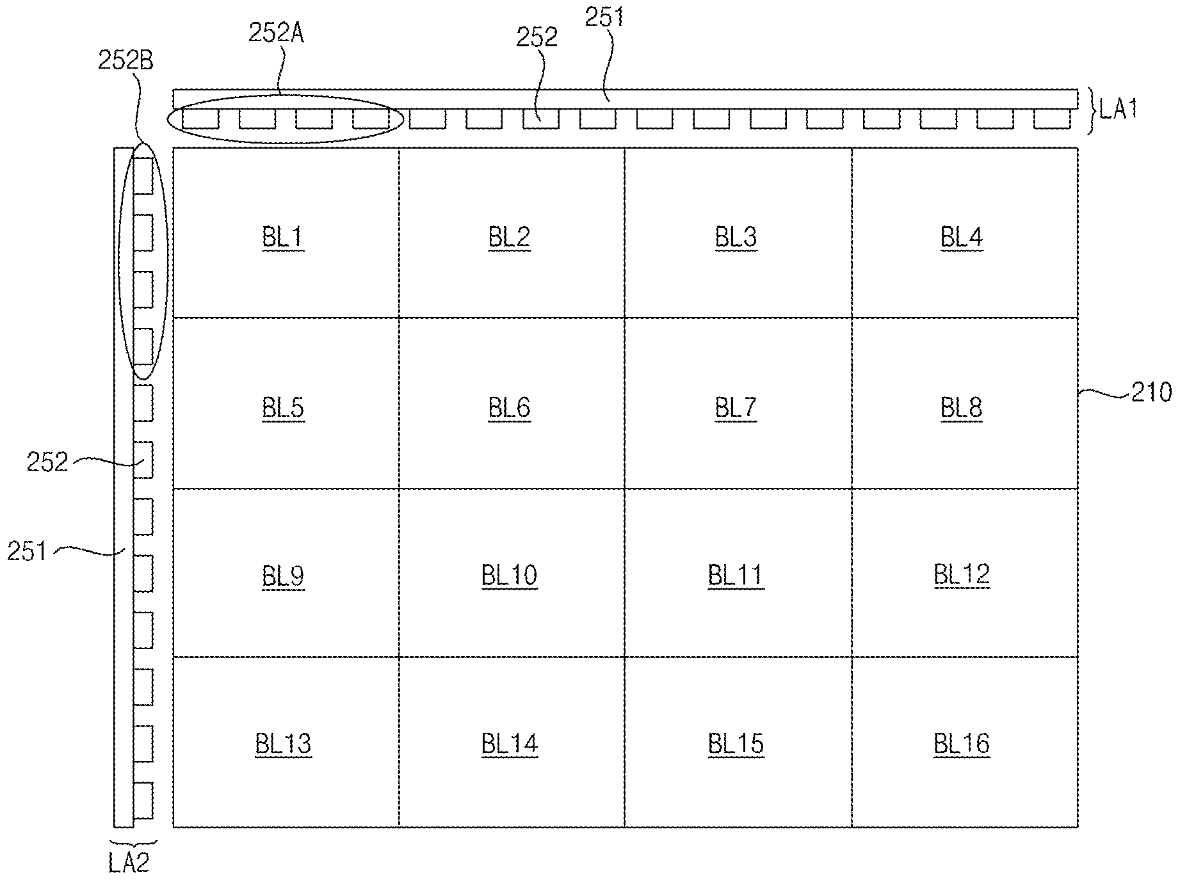
FIG. 5 is an example showing arrangement of a liquid crystal display panel and light sources in a direct-type backlight.
Figure 6:
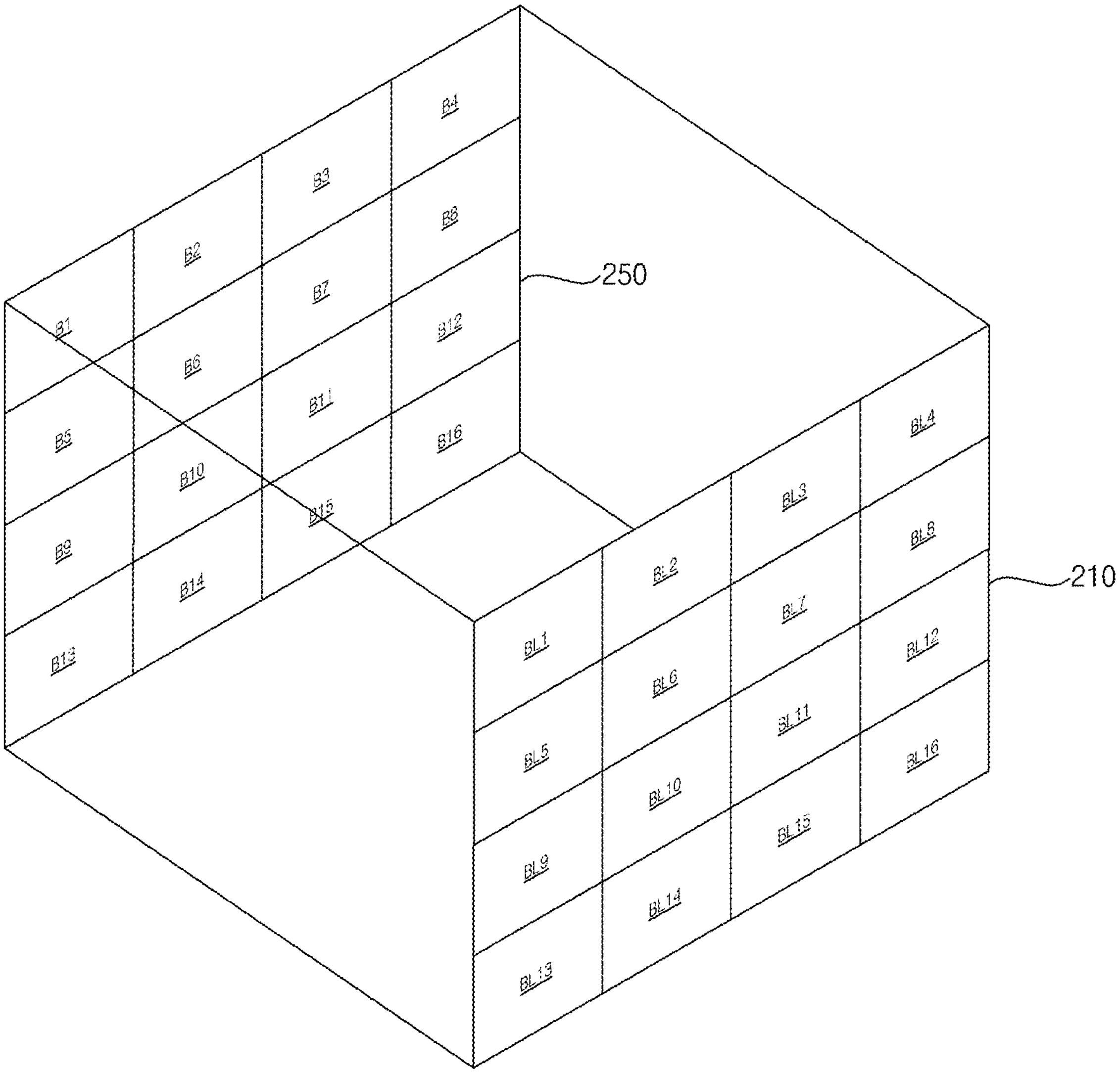
FIG. 6 is an example showing arrangement of a liquid crystal display panel and light sources in an edge type backlight.

FIG. 5 is an example diagram showing the arrangement of a liquid crystal display panel and light sources in the case of an edge-type backlight, and FIG. 6 is an example diagram showing the arrangement of a liquid crystal display panel and light sources in the case of a direct-type backlight.

The liquid crystal display panel 210 may be divided into a plurality of panel blocks as shown in FIGS. 5 and 6. FIGS. 5 and 6 illustrate that the liquid crystal display panel 210 is equally divided into 16 blocks BL1 to BL16, but it should be noted that it is not limited thereto. Each of the plurality of panel blocks may include a plurality of pixels.

The backlight 250 may be implemented as either an edge type or a direct type.

The edge-type backlight 250 has a structure in which a plurality of optical sheets and a light guide plate are stacked below the liquid crystal display panel 210, and a plurality of light sources are disposed on the sides of the light guide plate.

When the backlight 250 is implemented as an edge-type backlight, light sources are disposed on at least one of the upper and lower sides and at least one of the left and right sides of the liquid crystal display panel 210.

In FIG. 5, the first light source array LA1 is disposed on the upper side of the liquid crystal display panel 210, and the second light source array LA2 is disposed on the left side of the liquid crystal display panel 210. Each of the first and second light source arrays LA1 and LA2 includes a plurality of light sources 252 and a light source circuit board 251 on which the plurality of light sources 252 are mounted. In this case, the brightness of the light incident on the first block BL1 of the liquid crystal display panel 210 may be adjusted using the light sources 252A of the first light source array LA1 disposed at a position corresponding to the first block BL1 of the liquid crystal display panel 210 and the light sources 252B of the second light source array LA2.

The direct backlight 250 has a structure in which a plurality of optical sheets and a diffusion plate are stacked below the liquid crystal display panel 210 and a plurality of light sources are arranged below the diffusion plate.

When the backlight 250 is implemented as a direct backlight, it is divided to correspond one-to-one to the blocks BL1 to BL16 of the liquid crystal display panel 210, as shown in FIG. 6. In this case, the brightness of the light incident on the first block BL1 of the liquid crystal display panel 210 may be adjusted using the light sources 252 included in the block B1 of the backlight 250 disposed at a position corresponding to the first block BL1 of the liquid crystal display panel 210.

The light sources 252 may be implemented as point light sources such as light emitting diodes (LEDs). The light sources 252 are turned on and off by receiving a light source driving signal (LDS) from the light source driver 256.

The light source driving signal may be a PWM (Pulse Width Modulation) signal.

The light intensity of the light sources 252 may be adjusted according to the amplitude of the light source driving signal (LDS), and the lighting period may be adjusted according to the pulse width (or duty ratio). The brightness of light output from the light sources 252 may be adjusted according to the light source driving signal (LDS).

The light source driver 256 may generate the light source driving signal (LDS) based on the dimming value of each block input from the backlight dimming controller 510 and output them to the light source 252.

Figure 7:
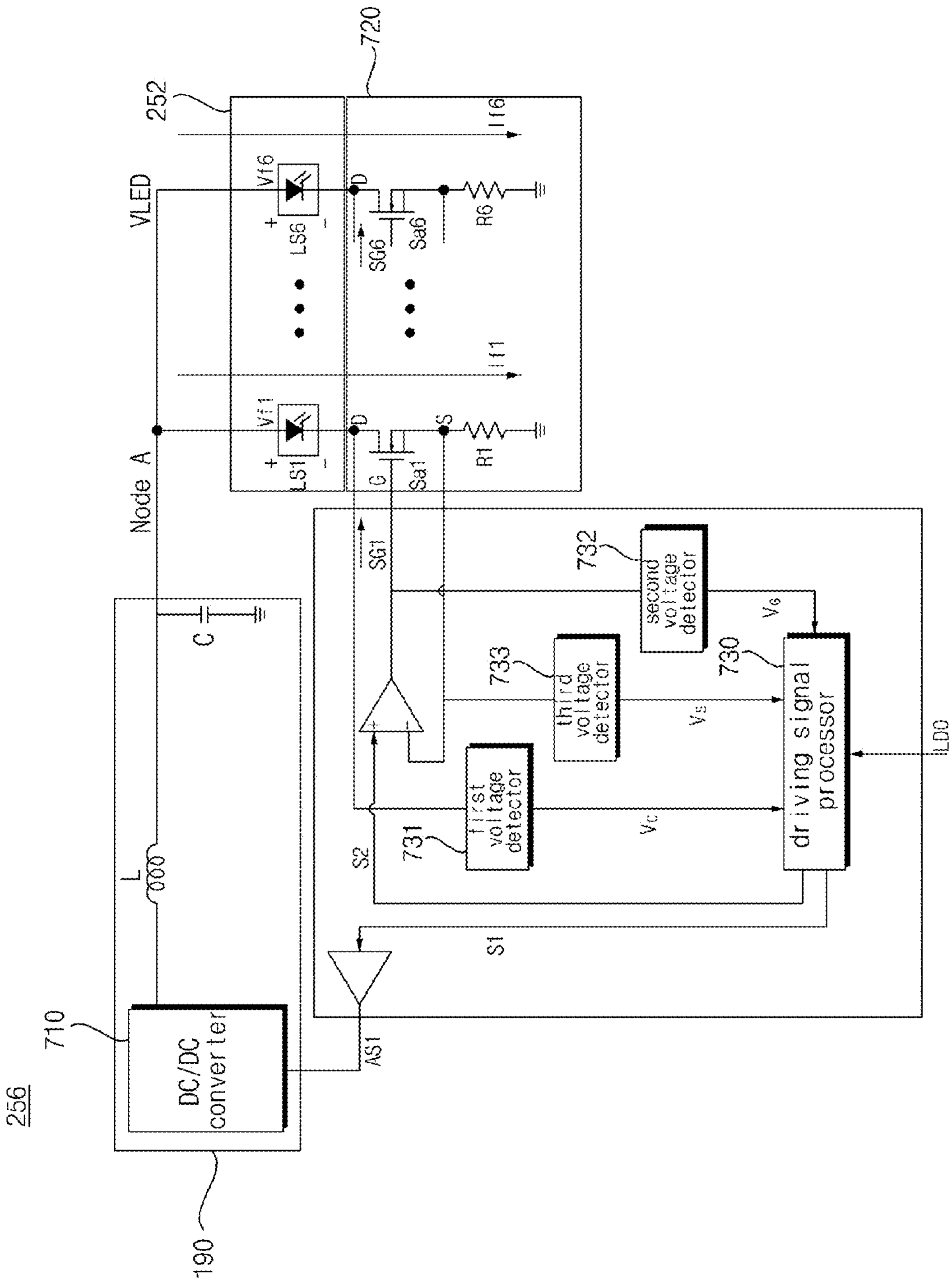
FIG. 7 is an example of a light source driving circuit according to an embodiment of the present disclosure.

FIG. 7 is an example of a light source driving circuit according to an embodiment of the present disclosure.

The light source driving circuit 256 may include a light source control circuit 720 that drives a plurality of light sources (LS1 to LS6) 252 and a driving signal processor 730 that controls the light source control circuit 720.

The light source driving circuit 256 may receive a power from the power supply circuit 190. The power supply circuit 190 may supply a common power source (VLED) to a plurality of light sources (LS1 to LS6) 252 connected in parallel.

Each of the light sources LS1 to LS6 represents a light source, and each light source may include a plurality of LEDs in series.

Meanwhile, as the resolution of the display device 100 increases to High Definition (HD), Full HD, Ultra High Definition (UHD), 4K, 8K, etc., the number of LEDs may increase.

Meanwhile, when using the high-resolution display panel 210, in order to improve contrast, it is desirable to control the current If with a changed level to flow for each light source based on local dimming data.

According to this, by allowing the level-changed current If to flow in proportion to the local dimming data, a light of different luminance according to the local dimming data is output for each of the plurality of light sources LS1 to LS6.

Accordingly, due to the current If whose level is increased, the luminance of the bright part becomes brighter and the luminance of the dark part becomes darker. Ultimately, the contrast when displaying an image is improved, and the sharpness when displaying an image is improved.

The power supply circuit 190 outputs a common voltage (VLED) to a plurality of light sources. For this purpose, the power supply circuit 190 may include a dc/dc converter 710 for converting the level of a direct current power and outputs it, an inductor (L) for removing harmonics, etc., and a capacitor (C) for storing the direct current power.

The voltage across the capacitor (C) corresponds to the voltage supplied between node A and a ground terminal, which corresponds the voltage applied to a plurality of light sources (LS1 to LS6) 252 and a plurality of switching elements (Sa1 to Sa6), and the resistance elements (R1 to R6). That is, the voltage of node A is the common voltage supplied to the plurality of light sources LS1 to LS6, and may be referred to as the VLED voltage, as shown in the figure.

The VLED voltage is equal to a sum of a driving voltage (Vf1) of a first light source (LS1), a voltage across a first switching element (Sa), and a voltage consumed in a first resistance element (Ra).

Alternatively, the VLED voltage is equal to a sum of a driving voltage (Vf2) of a second light source (LS2), a voltage across a second switching element (Sa2), and a voltage consumed in a second resistance element (Rb). Alternatively, the VLED voltage is equal to a sum of a driving voltage (Vf6) of a sixth light source (LS6), a voltage across a sixth switching element (Sa6), and a voltage consumed in a sixth resistance element (R6).

Meanwhile, as the resolution of the display panel 210 increases, the backlight driving voltage (Vf1 to Vf6) increases and the driving current (If1 to If6) flowing through the backlight also increases.

Meanwhile, the driving signal processor 730 includes a first voltage detector 731 that detects a voltage VD of each drain terminal (G) of the plurality of switching elements (Sa1 to Sa6) implemented with FET, etc.

Meanwhile, the driving signal processor 730 may further include a second voltage detector 732 that detects a voltage (VG) of each gate terminal (G), and a third voltage detector 733 that detects a voltage (VS) of each source terminal(S).

The driving signal processor 730 may compare each drain terminal voltage (VD) detected at each drain terminal (G) of the plurality of switching elements (Sa1 to Sa6), and based on the lowest drain terminal voltage among them, generate a target driving current flowing through the plurality of light sources LS1 to LS6 and output a switching control signal SG corresponding to the generated target driving current.

The switching control signal (SG) is input to the comparator, and when it is greater than the detected voltage (VD) of the source terminal, it is output from the comparator and input to the gate terminal (G). Ultimately, the switching element is driven based on the switching control signal (SG).

Meanwhile, in order to generate this switching control signal, the driving signal processor 730 may include a light source processor 730 that generates a switching control signal for driving each gate terminal of the plurality of switching elements Sa1 to Sa6 based on the voltage of each drain terminal of the plurality of switching elements Sa1 to Sa6.

Meanwhile, the light source processor 730 may vary a amplitude of the switching control signal SG based on a magnitude of the drain terminal voltage VD of each of the plurality of switching elements Sa1 to Sa6.

Figure 8:
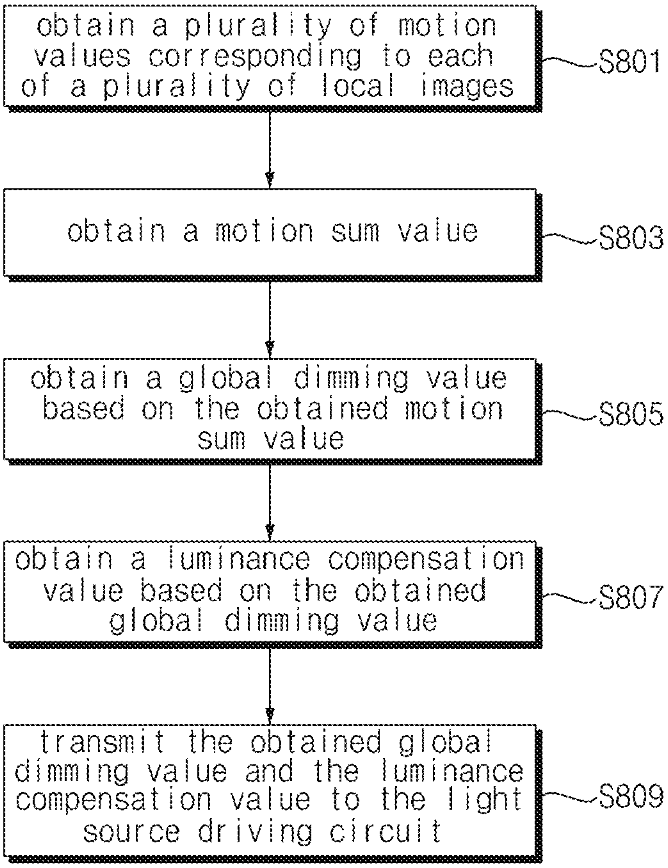
FIG. 8 is a flowchart illustrating a method of operating a display device according to an embodiment of the present disclosure.

FIG. 8 is a flowchart illustrating a method of operating a display device according to an embodiment of the present disclosure.

Backlight dimming may include local dimming, which individually controls the lighting times of the plurality of backlight blocks constituting the backlight 250, and global dimming, which collectively controls the lighting times of the plurality of backlight blocks constituting the backlight 250. there is.

In the embodiment of FIG. 8, these may be operations performed after the local dimming process. As another example, the embodiment of FIG. 8 may be operations performed when the local dimming process is omitted.

Referring to FIG. 8, the controller 170 of the display device 100 may obtain a plurality of motion values corresponding to each of a plurality of local images constituting an entire image displayed on the display 180 (S801).

The plurality of local images may be displayed on each of a plurality of divided panel blocks provided in the liquid crystal display panel 210 provided in the display 180.

Each of the plurality of panel blocks may correspond to each of the plurality of backlight blocks provided in the backlight 250.

The controller 170 may obtain a motion vector value between a local frame of a previous frame and a local frame of a current frame following the previous frame as the motion value of each local image.

The controller 170 may extract a value of a motion vector of the local image using a motion estimation/motion compensation (MEMC) technique, and obtain the value of the extracted motion vector as the motion value of the local image.

The MEMC technique may be a technique that extracts the difference between two consecutive video frames as a difference map and uses the extracted difference map to create a frame to be inserted between the previous frame and the current frame following the previous frame.

The controller 170 may extract the value of the motion vector corresponding to the local image during the motion prediction process of the MEMC technique, and obtain the value of the extracted motion vector as the motion value of the local image. The motion value may indicate a degree of movement of an object included in the local image.

Figure 9:
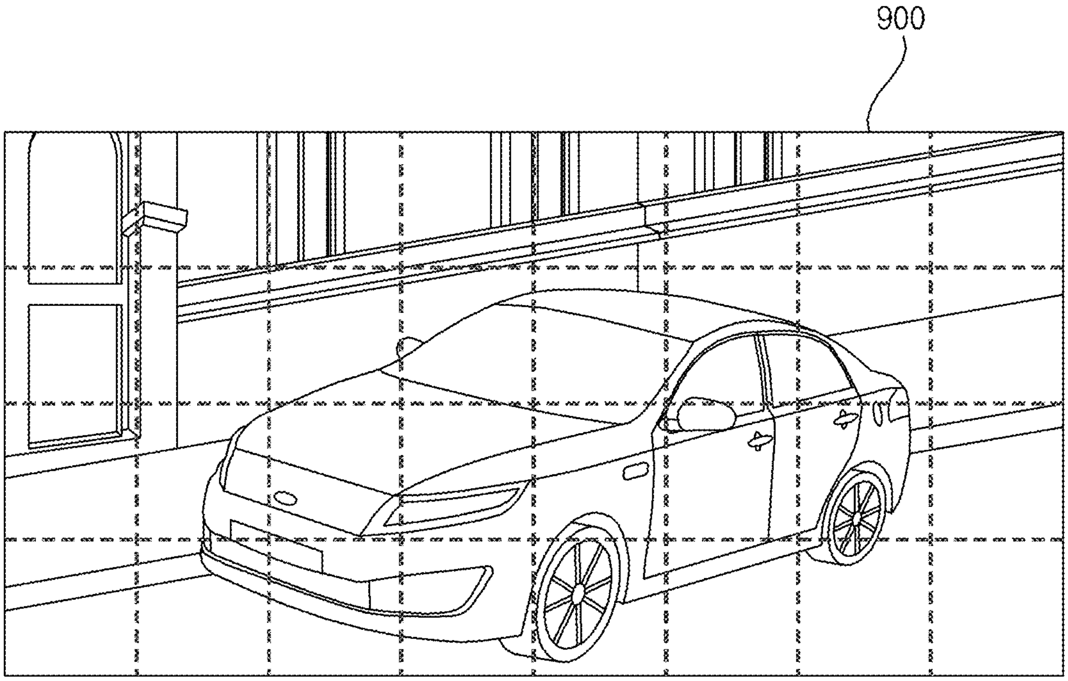
FIG. 9 is a diagram showing an example of a plurality of local images constituting an image according to an embodiment of the present disclosure.

FIG. 9 is a diagram showing an example of a plurality of local images constituting an image according to an embodiment of the present disclosure.

Referring to FIG. 9, the display 180 may display an image 900 including a plurality of local images. Each of the plurality of local images may have a square shape.

Each of the plurality of local images may be an image displayed in each of the plurality of panel blocks. Each of the plurality of panel blocks may correspond to each of the plurality of backlight blocks.

In FIG. 9, the number of local images is 32, but this is only an example.

The controller 170 may obtain the value of the motion vector of each of the plurality of local images as the motion value of each local image.

Again, FIG. 8 will be described.

The controller 170 may obtain a motion sum value by summing the plurality of obtained motion values (S803).

The controller 170 may obtain a motion sum value by summing a plurality of motion values to determine the degree of movement (or motion speed) of the image currently being displayed.

The controller 170 may obtain a global dimming value based on the obtained motion sum value (S805).

The controller 170 may determine a global dimming value based on the obtained motion sum value. The global dimming value may be a value for global dimming that uniformly controls the lighting time of a plurality of backlight blocks constituting the backlight 250.

The global dimming value may be a value corresponding to the duty (or duty ratio) of a signal for driving the plurality of backlight blocks provided in the backlight 250.

In one embodiment, the motion sum value and the global dimming value may be inversely proportional to each other. For example, as the motion sum value may increase, the global dimming value may decrease, and as the motion sum value may decrease, the global dimming value may increase.

The memory 140 may store a lookup table that matches the motion sum value and the global dimming value. The controller 170 may extract a global dimming value matching the motion sum value through the lookup table.

The global dimming value may have a minimum limit value and a maximum limit value. The minimum limit value may be a value corresponding to a duty ratio of 50%, and the maximum limit value may be a value corresponding to a duty ratio of 100%. The minimum limit value may be a value that exists to prevent the image from becoming too dark.

If the motion sum value is greater than or equal to a first value, the controller 170 may match the motion sum value to the minimum limit value. If the motion sum value is less than or equal to a second value less than the first value, the controller 170 may match the motion sum value to the maximum limit value.

Figure 10:
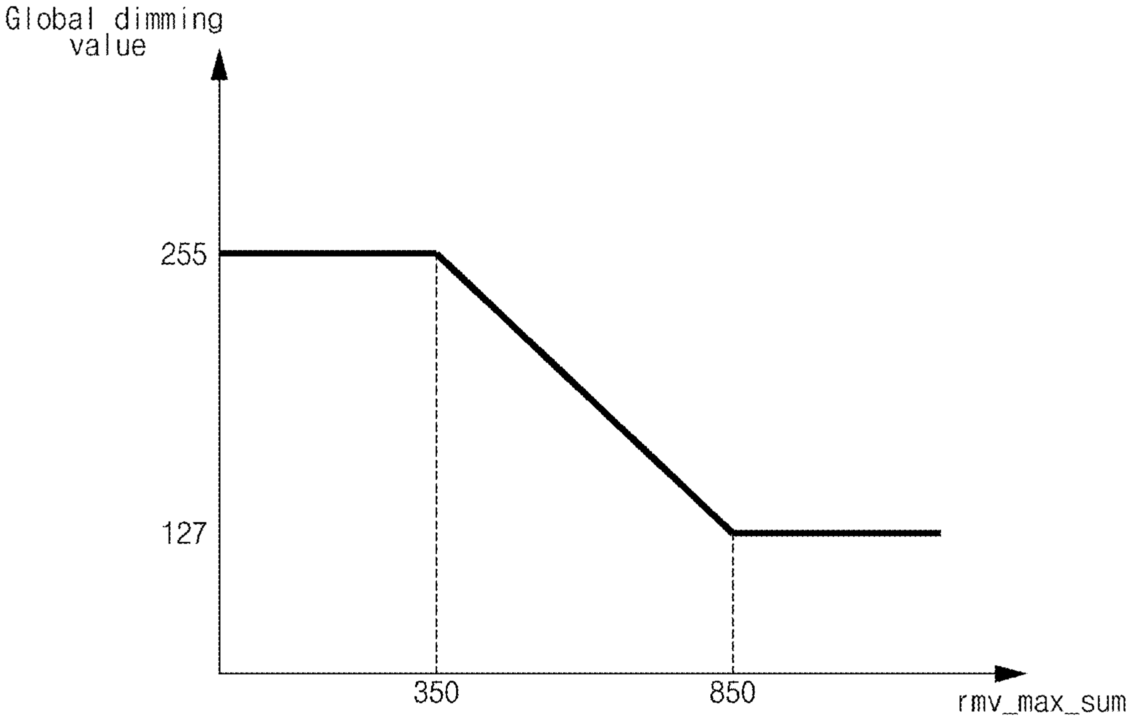
FIG. 10 is a diagram illustrating a graph showing a correspondence between a motion sum value and a global dimming value according to an embodiment of the present disclosure.

FIG. 10 is a diagram illustrating a graph showing the correspondence between a motion sum value and a global dimming value according to an embodiment of the present disclosure.

Referring to FIG. 10, it is a diagram illustrating a graph showing the matching relationship between the motion sum value (rmv_max_sum) and the global dimming value.

In one embodiment, the global dimming value may range from 0 to 255. 0 may be a value corresponding to the duty ratio of 0%, 127 may be a value corresponding to the duty ratio of 50%, and 255 may be a value corresponding to the duty ratio of 100%. The global dimming value and the duty ratio may be proportional.

If the motion sum value is greater than or equal to the first value (for example, 850), the global dimming value may be determined to be 127, which is the minimum limit value. If the motion sum value is less than or equal to the second value (for example, 350), the global dimming value may be determined to be 255, which is the maximum limit value.

The global dimming value may be inversely proportional to the motion sum value between the second value and the first value.

The memory 140 may store a lookup table representing the matching relationship between the motion sum value and the global dimming value.

Again, FIG. 8 will be described.

The controller 170 may obtain a luminance compensation value based on the obtained global dimming value (S807).

In one embodiment, the luminance compensation value may be a value for compensating for a luminance of an image that is reduced by applying a global dimming value. As the motion sum value may increase, the global dimming value may decrease. As the global dimming value may decrease, the luminance of the image may decrease. The controller 170 may compensate for luminance to prevent the image from becoming dark due to the global dimming value.

The luminance compensation value may be a value corresponding to an increment of a current to be supplied to the backlight 250 or a current multiplier. The current multiplier may be a value between 1 and 2.

The luminance compensation value may be a value obtained through a boost peak luminance (BPL) control method. The BPL control method may be a method of adjusting luminance by increasing the current flowing through the light source constituting the backlight 250 when an average of the dimming values of the backlight blocks is lowered (or lowered below a certain value).

The memory 140 may store a lookup table representing the correspondence between the global dimming value and the luminance compensation value. The controller 170 may extract the luminance compensation value that matches the global dimming value obtained from the lookup table.

Figures 11, 12:
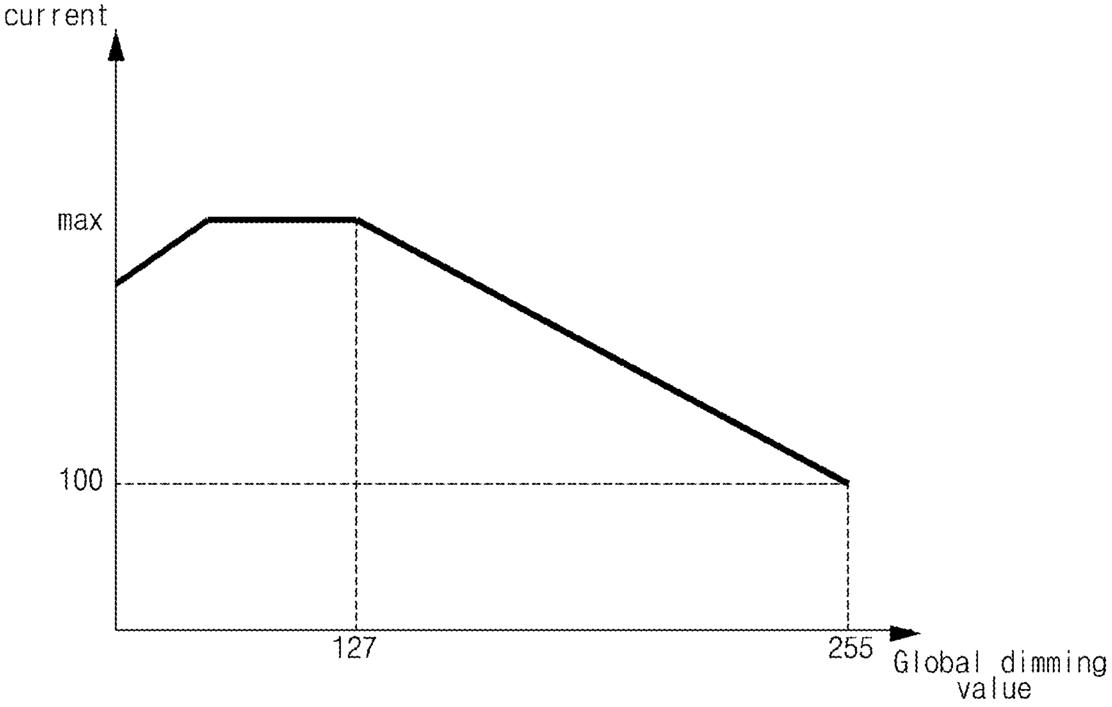
FIG. 11 is a diagram illustrating a graph showing a correspondence between the global dimming value and a luminance compensation value according to an embodiment of the present disclosure.
FIG. 12 is a diagram illustrating a table showing a correspondence between a motion sum value, a global dimming value, and a luminance compensation value according to an embodiment of the present disclosure.

FIG. 11 is a diagram illustrating a graph showing the correspondence between a global dimming value and a luminance compensation value according to an embodiment of the present disclosure.

The global dimming value may be a value in the range of 0 to 255. The luminance compensation value may correspond to a value of a current (or a current ratio) flowing through the light source 252.

When the global dimming value is 127 or less, the value of the current flowing through the light source 252 may be determined by ae maximum current value (max). The maximum current value may be 200, but this is only an example.

The value of the current flowing through the light source 252 may be at least 100 or more.

For example, when the global dimming value is 127 or less, the value of the current flowing through the light source 252 may be 160. The light source driving circuit 256 may increase the current flowing through the light source 252 to the maximum current value when the global dimming value becomes 127 as the motion sum value of the image becomes 850 or more.

As such, according to an embodiment of the present disclosure, as the duty of the signal provided to the light source 252 of the backlight 250 is adaptively changed, the current flowing in the light source 252 may also be adaptively changed.

Accordingly, the sharpness of the image with fast motion is improved and the luminance is compensated, thereby preventing the image from becoming dark.

FIG. 12 is a diagram illustrating a table showing the correspondence between a motion sum value, a global dimming value, and a luminance compensation value according to an embodiment of the present disclosure.

According to another embodiment of the present disclosure, the memory 140 may store a matching table 1200 indicating the correspondence between the motion sum value (rmv_Max_Sum), the global dimming value, and the brightness compensation value (BPL rate).

The motion sum value (rmv_Max_Sum) may be in a range from 0 to 1023. The global dimming value may be in a range of 0 to 255 on an 8-bit basis. The luminance compensation value may be expressed as a BPL rate and may be in a range of 1 to 2. The BPL rate is a current multiplier, where 1 may represent 100%, 1.5 may represent 150%, and 2 may represent 200%, respectively.

For example, if the motion sum value is 127 (slow motion), the global dimming value may be matched to 255 and the BPL rate may be matched to 1. If the motion sum value is 600 (middle motion), the global dimming value may be matched to 192 and the BPL rate may be matched to 1.5. If the motion sum value is 1023 (fast motion), the global dimming value may be matched to 127 and the BPL rate may be matched to 2.

Again, FIG. 8 will be described.

The controller 170 may transmit the obtained global dimming value and the luminance compensation value to the light source driving circuit 256 (S809).

The controller 170 may transmit the global dimming value and the luminance compensation value to the light source driving circuit 256 to control a light output of the backlight 250. The light source driving circuit 256 may generate a pulse width modulation signal with a duty ratio corresponding to the global dimming value, based on the global dimming value, and transmit the generated pulse width modulation signal to the light source 252.

At the same time, the light source driving circuit 256 may increase the current flowing through the light source 252 to correspond to the luminance compensation value. The light source driving circuit 256 may increase the backlight driving voltage to increase the current flowing through the light source 252 of the backlight 250.

As such, according to an embodiment of the present disclosure, as the duty of the signal provided to the light source 252 of the backlight 250 is adaptively changed, the current flowing in the light source 252 may also be adaptively changed.

Accordingly, the luminance is compensated while the sharpness is improved for fast-moving image, thereby preventing image darkening.

Figure 13:
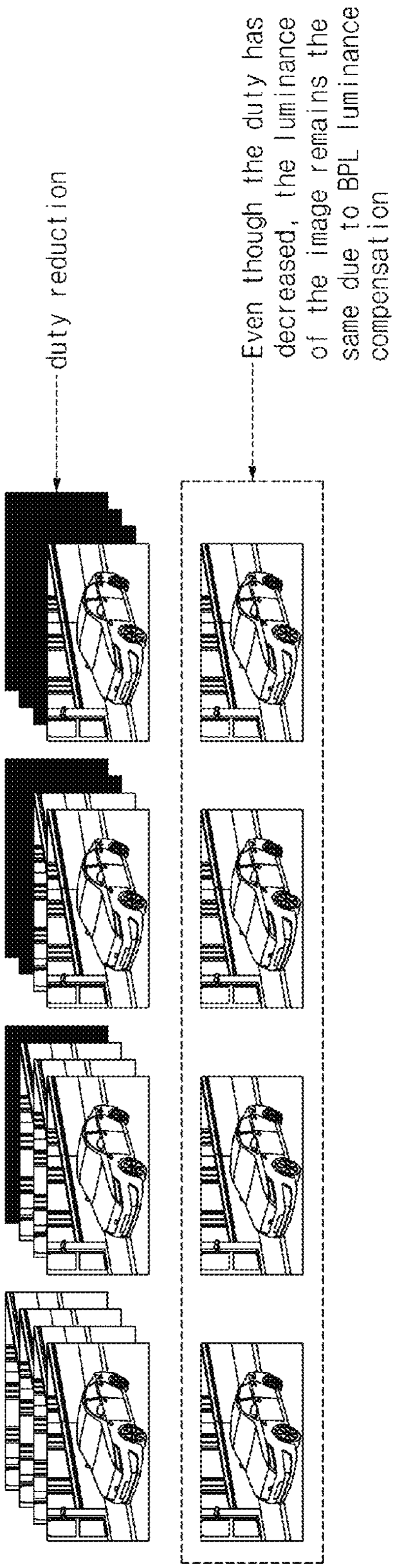
FIG. 13 is a diagram illustrating a process in which a duty is reduced and a luminance is compensated as the motion speed of an image increases according to an embodiment of the present disclosure.

FIG. 13 is a diagram illustrating a process in which a duty is reduced and a luminance is compensated as the motion speed of an image increases according to an embodiment of the present disclosure.

In FIG. 13, it is assumed that a first to fourth images 1311 to 1314 are the same image, and that the motion sum value increases from the first image 1311 to the fourth image 1314.

In other words, it is assumed that the motion speed of the image increases from the first image 1311 to the fourth image 1314.

As the motion speed of the image increases, the duty of the signal supplied to the light source 252 may decrease. As the duty of the signal supplied to the light source 252 is reduced, some frames of an image with a fast motion speed may become dark, and the entire image may become dark.

When the motion speed of an image increases, the display device 100 according to an embodiment of the present disclosure may adaptively increase the current flowing through the light source 252 in response to a decrease in duty. Accordingly, the luminance of the image is compensated, so the effect of reducing luminance due to duty reduction may not appear.

Figure 14:
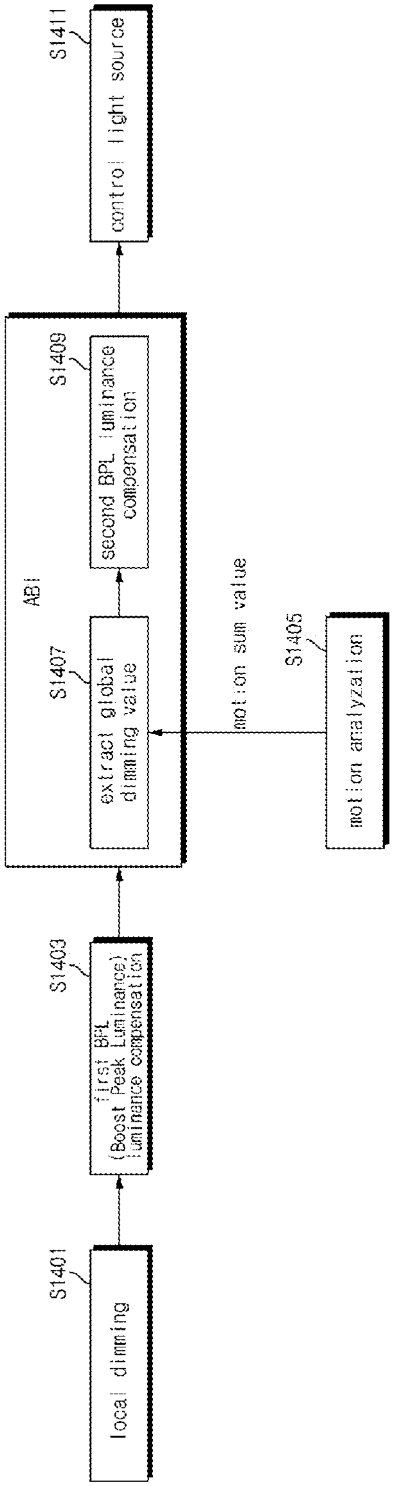
FIG. 14 is a diagram illustrating a method of operating a display device according to another embodiment of the present disclosure.

FIG. 14 is a diagram illustrating a method of operating a display device according to another embodiment of the present disclosure.

The controller 170 of the display device 100 may perform a local dimming process (S1401). The local dimming process may be a process of locally controlling a plurality of backlight blocks corresponding to each of a plurality of local images.

After performing the local dimming process, the controller 170 may perform a first BPL (Boost Peak Luminance) luminance compensation process (S1403).

The first BPL luminance compensation process may be a process of compensating luminance to increase the current flowing in a backlight block with a dimming value decreases a certain value or below after a local dimming.

After performing the local dimming process and the first BPL luminance compensation process, the controller 170 may analyze a motion of the image being played and calculate a plurality of motion values corresponding to each of the plurality of local images constituting the image, and obtain a motion sum value by summing the motion values (S1405).

The controller 170 may extract a global dimming value matching the motion sum value obtained for duty control for driving the light source 252 (S1407).

The controller 170 may perform a second BPL luminance compensation process to obtain a luminance compensation value corresponding to the extracted global dimming value (S1409).

The algorithm for obtaining the global dimming value and the luminance compensation value may be referred to as an Adaptive Backlight Intensity (ABI) algorithm. The ABI algorithm may be an algorithm that adaptively controls a light output intensity of the light source 252 provided in the backlight 250.

The controller 170 may transmit the global dimming value and the luminance compensation value corresponding to the global dimming value to the light source driving circuit 256, and the light source driving circuit 256 may control an operation of the light source 252 based on the global dimming value and the luminance compensation value (S1411).

The light source driving circuit 256 may reduce the duty of the PWM signal based on the global dimming value and increase the current flowing through the light source 252 based on the luminance compensation value.

According to an embodiment of the present disclosure, as the motion speed of the image changes, the duty of the signal that controls the operation of the light source 252 is adaptively changed, thereby improving the dragging phenomenon of the image and improving sharpness. Additionally, by performing luminance compensation according to the duty changes, darkening of the image may be prevented.

According to an embodiment of the present disclosure, a display device 100 may comprise a liquid crystal display panel 210 configured to display an image, a backlight 250 including a plurality of backlight blocks configured to provide a light to the liquid crystal display panel, wherein each of the plurality of backlight blocks includes a plurality of light sources and a controller 170 configured to obtain a plurality of motion values corresponding to each of a plurality of local images constituting the image, obtain a motion sum value of the image by summing the plurality of obtained motion values, and determine a global dimming value based on the obtained motion sum value.

The controller 170 may decrease the global dimming value as the motion sum value increases, and increase the global dimming value as the motion sum value decreases.

The display device 100 may further comprise a memory 140 configured to store a lookup table representing a matching relationship between the motion sum value and the global dimming value, wherein the controller 170 is further configured to extract the global dimming value matching the motion sum value through the lookup table.

The controller 170 may determine the global dimming value as a minimum limit value when the motion sum value is greater than or equal to a preset first value, and determine the global dimming value as a maximum limit value when the motion sum value is less than a preset second value less than the first value.

The controller 170 may obtain a luminance compensation value corresponding to the determined global dimming value.

The global dimming value may a duty of a signal for controlling a light source of the plurality backlight blocks, and the luminance compensation value is a value of a current flowing through the light source.

The controller 170 may obtain the value of the current that increases as the duty decreases.

The display device 100 may further comprise a memory 140 configured to store a lookup table representing a matching relationship between the global dimming value and the luminance compensation value, the controller 170 is configured to extract the luminance compensation value matching the global dimming value through the lookup table.

The controller 170 may, adaptively, determine the global dimming value and the luminance compensation value according to the motion sum value.

The controller 170 may extract a value of a motion vector of each local image using the motion estimation/motion compensation (MEMC) technique, and obtain the extracted value of the motion vector as the motion value.

The present disclosure described above may be implemented as computer-readable code on a program-recorded medium. Computer-readable media includes all types of recording devices that store data that may be read by a computer system. Examples of computer-readable media include HDD (Hard Disk Drive), SSD (Solid State Disk), SDD (Silicon Disk Drive), ROM, RAM, CD-ROM, magnetic tape, floppy disk, and optical data storage devices. Additionally, the computer may include a controller 170 of the display device 100. Accordingly, the above detailed description should not be construed as restrictive in all respects and should be considered illustrative.

What is claimed is:

1. A display device, comprising:
a liquid crystal display panel;
a backlight including a plurality of backlight blocks configured to provide a light to the liquid crystal display panel, wherein each of the plurality of backlight blocks includes a plurality of light sources; and
a controller configured to:
perform a local dimming process to determine a local dimming value for each of the plurality of backlight blocks based on a plurality of local images constituting an entire image to be displayed by the liquid crystal display panel;
obtain a plurality of motion values corresponding to each of the plurality of local images,
obtain a motion sum value of the entire image by summing the plurality of obtained motion values,
determine, subsequent to the local dimming process, a uniform global dimming value for the plurality of backlight blocks based on the obtained motion sum value, wherein the uniform global dimming value is a duty of a signal for controlling the plurality of light sources;
obtain a luminance compensation value corresponding to the determined uniform global dimming value, wherein the luminance compensation value is a value of a current flowing through the plurality of light sources; and
increase the value of the current as the duty decreases.

2. The display device of claim 1, wherein the controller is further configured to:
decrease the uniform global dimming value as the motion sum value increases, and
increase the uniform global dimming value as the motion sum value decreases.

3. The display device of claim 1, further comprising a memory configured to store a lookup table representing a matching relationship between the motion sum value and the uniform global dimming value,
wherein the controller is further configured to extract the uniform global dimming value matching the motion sum value through the lookup table.

4. The display device of claim 1, wherein the controller is configured to:
determine the uniform global dimming value as a minimum limit value when the motion sum value is greater than or equal to a preset first value, and
determine the uniform global dimming value as a maximum limit value when the motion sum value is less than a preset second value less than the first value.

5. The display device of claim 1, further comprising a memory configured to store a lookup table representing a matching relationship between the uniform global dimming value and the luminance compensation value,
wherein the controller is configured to extract the luminance compensation value matching the uniform global dimming value through the lookup table.

6. The display device of claim 1, wherein the controller is configured to, adaptively, determine the uniform global dimming value and the luminance compensation value according to the motion sum value.

7. The display device of claim 1, wherein the controller is configured to:
extract a value of a motion vector of each local image using a motion estimation/motion compensation (MEMC) technique, and
obtain the extracted value of the motion vector as the motion sum value.

8. A method of operating a display device including a liquid crystal display panel and a backlight including a plurality of backlight blocks configured to provide a light to the liquid crystal display panel, wherein each of the plurality of backlight blocks includes a plurality of light sources, wherein the method comprises:
performing a local dimming process to determine a local dimming value for each of a plurality of backlight blocks based on a plurality of local images constituting an entire image to be displayed by the liquid crystal display panel;
obtaining a plurality of motion values corresponding to each of the plurality of local images,
obtaining a motion sum value of the entire image by summing the plurality of obtained motion values,
determining, subsequent to the local dimming process, a uniform global dimming value for the plurality of backlight blocks based on the obtained motion sum value, wherein the uniform global dimming value is a duty of a signal for controlling the plurality of light sources;
obtaining a luminance compensation value corresponding to the determined uniform global dimming value, wherein the luminance compensation value is a value of a current flowing through the plurality of light sources; and
increasing the value of the current as the duty decreases.

9. The method of claim 8, wherein the determining comprises:
decreasing the uniform global dimming value as the motion sum value increases, and
increasing the uniform global dimming value as the motion sum value decreases.

* * * * *